Patented Nov. 20, 1934

1,981,634

UNITED STATES PATENT OFFICE 1,981,634

PROCESS FOR THE PREVENTION OF FOAM

Roger W. Richardson and Richard B. Schneider, Wilmington, Del., assignors to E. I. du Pont de Nemours & Company, Wilmington, Del., a corporation of Delaware No Drawing. Application April 13, 1932, Serial No. 605,114

7 Claims. (Cl. 252—6)

This invention relates to a means for abating and inhibiting the foaming tendency of liquids and more particularly to chemical processes in which various liquids having strong foaming tendencies are processed without the formation of undesirable stable foam.

Various compositions have been proposed for the prevention or inhibition of foam in liquids. For example, linseed oil, kerosene, oil of cloves, the extracts of tannin and bark with castor oil, and numerous other compositions and mixtures of apparently unrelated compounds have been used for this purpose with more or less success. None of these compounds or compositions of matter, however, have been as active or as efficient as is ordinarily desired.

This invention has for an object the provision of a new type of anti-foam composition of matter which has a manifold greater foam-inhibiting power for numerous applications than any of the, at present, known or used anti-foam agents. Another object of the invention is to provide a means for improving many chemical and allied processes wherein foaming is encountered, by the employment of a new type of anti-foam agent. A still further object of the invention is to provide a powerful anti-foam agent together with a dispersing agent for quickly disseminating the former over and/or through the liquid, the foaming characteristics of which it is desired to abate or inhibit. Other objects and advantages will hereinafter appear.

We have found that liquids having a tendency to foam are inhibited or abated entirely in such action by having present in the liquid the oxygenated organic compounds obtained by the catalytic hydrogenation of carbon oxides under elevated temperature and pressure. The compounds which we have found preeminently suited for this purpose are the compounds remaining as residue when those boiling below 200° C. have been removed.

The compounds are produced as by-products in the synthesis of methanol by the catalytic hydrogenation of carbon oxide under elevated pressure. Various methods have been proposed for synthesizing these compounds, among which is the process described by Roger Williams in U. S. Patent No. 1,820,417, which is cited merely as an example of such processes well known in this art. When conducting these syntheses under a given set of conditions a high percentage of alcohols, which have a boiling point above methanol, can be produced and, conversely, when operating under another given set of conditions products containing substantially no high boiling alcohols may be obtained. Naturally, when preparing the products from which our anti-foam agent is derived it is an advantage to operate under the former set of conditions. The compounds obtained by these syntheses are predominantly alcohols, including such alcohols as n-propanol, iso butanol, 2-methyl-butanol-1, 3-methyl-butanol-2, 2,4-dimethyl pentanol-3, 3-methyl pentanol-2, 4-methyl hexanol-1, and other alcohols. Oxygenated organic compounds besides the alcohols are also present, but in small amounts. Our anti-foam agent is separated from the mixture of alcohols obtained from the methanol synthesis processes by the following method or any method which will result in obtaining an analogous product or products. The condensate from the alcohol synthesis is distilled, and all the lower boiling products, i. e. those boiling below 200° C., are distilled over leaving as a residue, our anti-foam composition, which comprises, so far as we now know, a mixture of primary and secondary branch chain alcohols containing eight or more carbon atoms, the primary and secondary alcohols being present in substantially equal amounts. The individual alcohols contained in this mixture have not been identified.

Our anti-foam composition has been fractionated into a series of fractions, namely, fractions having a boiling range of from 200–215° C., 215–225° C., and the residue from which all compounds boiling below 225° C. have been removed. Closer fractions may, of course, be made, and as would be expected, the individual fractions differ somewhat in their ability to abate foam. Consequently, when treating any particular liquid to suppress its foaming characteristics, the whole composition or a fraction thereof will often be found to be most efficient although we have found that, generally speaking, the fraction containing only products boiling above 225° C. has a much greater ability to suppress foam than the whole composition or any of the other fractions.

The manner in which our anti-foam agents are added to the liquid is not critical, the more important considerations being that it be dispersed or disseminated quickly and thoroughly over the liquid. In some instances particularly when using our preferred fraction this is not accomplished as quickly as is desired, owing to the type of liquid treated, relative viscosity of the anti-foam agent, etc. In order, therefore, to increase the rapidity with which our compounds act, we have found it desirable, in many instances, to combine a dispersing agent therewith. The dispersing agent should be miscible with the oxygenated organic compounds and be capable of distributing the agent in an extremely finely divided state or dispersed form over the liquid to be treated. Examples of such agents are ethyl alcohol, methyl alcohol, acetone, pine oil, sulfonated castor oil, kerosene, etc., and in many instances we have found that the lower boiling oxygenated organic compounds obtained as by products from the methanol synthesis, i. e. those which boil from approximately 130–200° C., are often suitable for this purpose particularly in view of the fact that these compounds also have the ability to suppress foam although not to the surprising degree of our preferred compounds. Due to the fact that a large number of organic compounds are soluble in our anti-foam agent many compounds are available as dispersing agents. The nature of the dispersing agent employed and the fluid being treated determines in large measure the concentration of the dispersing agent required for optimum results. Generally speaking, it may vary from 5–25% or more by volume of the anti-foam agent utilized.

The exceptional anti-foaming powers of our compounds will be realized by comparing them to the anti-foam characteristics of oil of cloves, for example. It has been found that in order to suppress foaming in solutions for coating paper, for use in paper finishing machines in the known manner, only approximately one-fifth as much of our compound is required to inhibit the foaming of the mixture than is required when oil of cloves is used which, up to the present time, has been considered one of the best materials for this purpose.

We will now give several examples illustrating the adaptability of our anti-foam agents for the suppression or abatement of foam in various compositions. It will be understood, of course, that we are not limited by the details or specific embodiments therein shown.

*Example 1.*—The following composition of matter for coating paper has many advantages over similar compositions now employed as it is substantially non-foaming. The solutions or mixtures A, B, and C are first prepared.

(A) 300 lbs. of clay, 41 gals. of water, 5 ounces of ammonia;
(B) 50 lbs. of casein, 21 gals. of water;
(C) 5¼ lbs. of borax, 2¾ lbs. of soda ash, 5 ounces of ammonia, 16 gals. of water.

The solutions designated as (B) and (C) are thoroughly mixed together and thereafter they are gradually ground into the magma (A). In order to prevent the above coating mixture from foaming when being applied to the paper, one-half an ounce of our anti-foam agent and preferably the fraction designated as containing only products boiling above 225° C. is added to the magma (A) prior to the latter's admixture with the combined materials (B) and (C). The coating composition is now ready for application to the paper.

*Example 2.*—An anti-form composition containing approximately 66⅔% of our composition, i. e. the residue left after all compounds boiling below 200° C. have been removed, and 33⅓% of a dispersing agent consisting of the lower boiling alcohols obtained as a by-product from the synthesis of methanol and boiling from approximately 133–147° C. is dripped into the head box of a paper-making machine. It may be applied by dripping into the vessel ahead of the Fourdrinier or at any convenient place far enough ahead of the Fourdrinier wire to ensure thorough mixing. It is applied in this manner at a rate of from approximately one pint to one quart of the anti-foam mixture per ton of paper made. An anti-foam composition containing 75% of our anti-foam agent boiling above 200° C. containing 25% methanol may be used in approximately the same proportions with in most instances about the same results.

The amount of our anti-foam compounds to be used in any particular process cannot be definitely defined because of the variance of such factors as surface tension of the solution, superficial surface area exposed, the temperature and violence of the agitation, and the various compounds in the solution which aggravate the foam. The necessary quantity is relatively small, however, and for any particular use the optimum amount can be readily determined by trial.

The invention has a wide variety of uses in chemical processes, particularly those where gas or vapor is evolved. Among processes of this type may be mentioned the neutralization of acid solutions with soda ash or calcium carbonate, the thermal decomposition of diazonium salt solutions, the manufacture of hydrochloric acid from salt, and sulfuric acid, the carbonization of beet sugar, the evaporation of steep water in corn products manufacture, the evaporation of soda pulp black liquor, and steam distillations. Other applications of the invention are the reduction or elimination of foam in locomotive and marine boilers, in turbine oils, in coating solutions for paper finishing, and in the paper industry to remove or lessen foam in the beaters of paper machines.

As many improvements and modifications of the above invention will be apparent upon a realization of its various embodiments, any such improvement will come within the scope of this invention without sacrificing any of the advantages that may be derived therefrom.

We claim:

1. The process of decreasing foaming in liquids which comprises adding thereto a portion of the higher boiling organic oxygen-containing compounds obtained as by-products of the catalytic synthesis of methanol by pressure hydrogenation of carbon oxide, this portion containing the compounds, predominantly alcohols, which remain after all compounds boiling below 200° C. have been removed.

2. The process of decreasing foaming in liquids which comprises adding thereto a portion of the higher boiling organic oxygen-containing compounds obtained as by-products of the catalytic synthesis of methanol by pressure hydrogenation of carbon oxide, this portion containing the compounds, predominantly alcohols, which remain after all compounds boiling below 225° C. have been removed.

3. The process of decreasing foaming in liquids which comprises adding thereto a portion of the higher boiling organic oxygen-containing compounds obtained as by-products of the catalytic synthesis of methanol by pressure hydrogenation of carbon oxide, this portion containing the compounds, predominantly alcohols, which remain after all compounds boiling below 200° C. have been removed, these compounds being used in conjunction with a dispersing agent.

4. The process of decreasing foaming in liquids which comprises adding thereto a portion of the higher boiling organic oxygen-containing compounds obtained as by-products of the catalytic synthesis of methanol by pressure hydrogenation of carbon oxide, this portion containing the compounds, predominantly alcohols, which remain after all compounds boiling below 225° C. have been removed, these compounds being used in conjunction with a dispersing agent.

5. The process of decreasing foaming in liquids which comprises adding thereto a portion of the higher boiling organic oxygen-containing compounds obtained as by-products of the catalytic synthesis of methanol by pressure hydrogenation of carbon oxide, this portion containing the compounds, predominantly alcohols, which remain after all compounds boiling below 200° C. have been removed, these compounds being used in conjunction with a dispersing agent comprising compounds also obtained as by-products in the methanol synthesis but having a boiling range of from 130–200° C.

6. The process of decreasing foaming in liquids which comprises adding thereto a portion of the higher boiling organic oxygen-containing compounds obtained as by-products of the catalytic synthesis of methanol by pressure hydrogenation of carbon oxide, this portion containing the compounds, predominantly alcohols, which remain after all compounds boiling below 200° C. have been removed, these compounds being used in conjunction with pine oil.

7. The process of decreasing foaming in liquids which comprises adding thereto a portion of the higher boiling organic oxygen-containing compounds obtained as by-products of the catalytic synthesis of methanol by pressure hydrogenation of carbon oxide, this portion containing the compounds, predominantly alcohols, which remain after all compounds boiling below 200° C. have been removed, these compounds being used in conjunction with sulfonated castor oil.

ROGER W. RICHARDSON.
RICHARD B. SCHNEIDER.